United States Patent
Bhagavath et al.

(10) Patent No.: US 6,950,439 B1
(45) Date of Patent: Sep. 27, 2005

(54) METHOD FOR PROVIDING SUMMARY INFORMATION ABOUT RECIPIENTS OF IP MULTICAST SESSIONS

(75) Inventors: Vijay K Bhagavath, Lincroft, NJ (US); Joseph Thomas O'Neil, Staten Island, NY (US)

(73) Assignee: AT&T Corp., Bedminster, NJ (US)

( * ) Notice: Subject to any disclaimer, the term of this patent is extended or adjusted under 35 U.S.C. 154(b) by 0 days.

(21) Appl. No.: 09/473,544

(22) Filed: Dec. 28, 1999

(51) Int. Cl.$^7$ ................................................. H04J 3/26
(52) U.S. Cl. .................... 370/432; 370/389; 370/390; 370/401
(58) Field of Search ................. 370/351, 356, 370/389, 401, 390, 392, 431, 432; 705/7, 705/8, 10; 725/14, 16

(56) References Cited

U.S. PATENT DOCUMENTS

| | | | |
|---|---|---|---|
| 5,251,324 A * | 10/1993 | McMullan, Jr. | 725/14 |
| 6,181,697 B1 * | 1/2001 | Nurenberg et al. | 370/390 |
| 6,304,558 B1 * | 10/2001 | Mysore | 370/312 |
| 6,553,028 B1 * | 4/2003 | Tang et al. | 370/389 |

OTHER PUBLICATIONS

"Routing in the Internet", by C. Huitema, Prentice Hall, 1995, pp. 246-248.
"Multicast Networking and Applications", by K. C. Miller, Addison Wesley, 1999, pp. 30-34.
"Deploying IP Multicast in the Enterprise", by T. A. Maufer, Prentice Hall, 1998, pp. 66-76.
"Internet Group Management Protocol, Version 3", by Brad Cain, Bay Networks, Steve Deering, Cisco Systems and Ajit Thyagarajan, Torrent Networks, Internet Engineering Task Force, Internet Draft, Nov. 21, 1997, expires May 1998, pp. 1-26.

* cited by examiner

Primary Examiner—Wellington Chin
Assistant Examiner—Raj Jain

(57) ABSTRACT

A method is provided for providing content providers with specific information about recipients receiving a multicast session, which minimally impacts applicable standards and network equipment. By judicious enhancement of the network POP (i.e., Point-of-Presence) and multicast packet header (i.e., datagram) enhancement, the identity of a recipient or host may be identified in a suitable manner that provides the content provider with information about the recipients as a group with out compromising the privacy of any individual host/recipient of a multicast session.

10 Claims, 3 Drawing Sheets

Enhanced IGMP message format:

| Type | Max Resp Time | Checksum |
|---|---|---|
| Group Address | | |
| Host Address | | |

IGMP Version 2 message format:

| Type | Max Resp Time | Checksum |
|------|---------------|----------|
| Group Address ||||

(Prior art)

FIG. 1

Enhanced IGMP message format:

| Type | Max Resp Time | Checksum |
|------|---------------|----------|
| Group Address |||
| Host Address |||

FIG. 2

METHOD FOR PROVIDING SUMMARY INFORMATION ABOUT RECIPIENTS OF IP MULTICAST SESSIONS

FIELD OF THE INVENTION

This invention is concerned with IP multicasting sessions and in particular with obtaining and storing information concerning multicast recipients.

BACKGROUND OF THE INVENTION

Multicasting is a communication technique permitting a single transmission device to transmit to a plurality of receiving devices. It differs from broadcasting over a radio air interface by, for example, defining specific recipients as group members in contrast to broadcast media. It often uses a wired network to transmit from a single transmission source device to a designated group of receiving devices. Being different from traditional broadcasting, the advent of multicast presents the opportunity to exploit its medium in many ways to permit development of advantageous features not available in the traditional broadcast medium.

Multicasting in a network setting simultaneously sends messages to a selected group of receiving (i.e., PCs; workstations, etc.) stations. The network may comprise, in-part or in-total separately or in combination, a telephone network; an Internet network; a LAN, a WAN and other similar arrangements. Multicast transmissions, from a network termination point to a host receiver device, of a receiving group, are subject to IGMP (Internet Group Management Protocol) standards. Examples of network termination points, to which a group of host receivers may be connected, are edge routers; gateways and other edge devices located in an IP network point-of-presence, etc.

IGMP is a protocol that is used to provide group membership data to neighboring multicast routers at the edge of a network. Recipient hosts are individually queried as to the membership group that they belong to and each provides leave group messages when a host wishes to leave a multicast session. A purpose of these queries is to insure that only group end hosts receive the multicast sessions. IGMP is only a subset of existing IP protocols but it is essential in order for the multicast session to work. While supposedly dealing with a group of recipient hosts its queries are generally individually received by all recipient host stations of that group. The last active station of a group sends notice that it is ending its multicast session and the multicast source ceases transmissions to the now inactive group. IGMP is currently in version 2, but a version 3 is presently being developed. A typical header of an IGMPv2 is shown in the FIG. 1.

It is desirable to obtain new advantages from attributes that the multicast system presents to the network (i.e., source content provider) provider. Many advantages are desirable but may not conform to existing IGMP protocol standards. In other instances such advantages may not conform to capabilities of existing equipment. It is desirable that any new features conform to existing IGMP and IP standards and network equipment.

SUMMARY OF THE INVENTION

A method is provided for providing content providers with specific information about recipients receiving a multicast session, which conform to applicable standards and network equipment. By judicious enhancement of the network POP (i.e., Point-of-Presence) and multicast packet header (i.e., datagram) enhancement, the identity of a recipient or host may be identified in a suitable manner that provides the content provider with information about the recipients as a group without compromising the privacy of any individual host/recipient of a multicast session.

In a particular embodiment of the invention, information (i.e., demographic) about host recipients of the multicast are gathered through enhanced multicast-unicast gateways (MUG) included in the network point-of-presence of the host and through the agency of an enhanced IGMP (i.e., non-conflicting additions to the protocol standard). The information is processed at the POP and stored in a measurement server, either during or after the multicast session. This information may be provided to the multicast session provider. It may also be used to automatically initiate actions in response to parameters specified by the session provider. It may be used to dynamically select content such as notices and/or advertising offerings.

Content providers make use of this information to specify direct notices and advertising to the recipient hosts. Selectivity may be based on location of the recipient host; the number of recipient hosts connected to the multicast; the programming selected by the multicast recipient host and other similar considerations. These selections may be made prior to a multicast session with instructions to respond dynamically to recipient host information collected during of a session or made prior to a multicast session based on prior collected information. Such information may be made available subsequent to a multicast session in order to provide for contracted billing information. Thus the information collected may be put to many varied uses included and in addition to those enumerated above.

In another variant the information collected in the process may be information valuable in its own right separate from the immediate addressing of notices to the host recipients. Demographics of a general nature may be collected over a period of time and used to tailor future multicast sessions to the existing audience. This information may, for example, be used to entice future sponsors and advertisers of projected multicast sessions/programming. Many other services that this information permits are readily apparent to users of this method and need not be specifically enumerated.

BRIEF DESCRIPTION OF THE DRAWINGS

FIG. 1 is a schematic of a multicast packet header used in IGMP;

FIG. 2 is a schematic of a modified multicast packet header used in IGMP and further enhanced to permit gathering of information about recipients of IP multicast sessions;

DETAILED DESCRIPTION

Providing multicast programming, in contrast to providing unicast programming, requires identifying host recipients in terms of a group membership or association. IGMP is a protocol that is used to provide group membership data to neighboring multicast routers at the edge of a network. IGMP is a protocol specifically used by IP systems. This protocol is used for additional control functions which are known to those in the art but which are not specified herein. It is periodically updated and revised and currently exists as version 2 (IGMPv2).

The existing IGMP (vesion 2) is reflected in a message (i.e., packet header) format as shown in the FIG. 1, which essentially presents a membership query. It includes a type number field which identifies the message type; a membership query, a membership report, etc. (i.e., membership of a group) Only messages with a specified type are dealt with for multicast purposes. The type number field is followed by a maximum response time field that defines the maximum elapsed time for the filing of a membership report. The check sum field includes a check number to validate correctness of the over all IGMP message. The group address field defines the address of a group query. These data fields are well known to those in the art and are not discussed further. Typical exemplary data are:

Type=0×11 Membership Query, 0×16 Membership Report, 0×17 Leave Group

The data provided by this message data header does not provide sufficient data to fulfill the objective of providing information about the host recipient. A host Address field is shown in the message data header of FIG. 2. The added address field is in harmony with the existing IGMP and provides the information to achieve the provision of data concerning the host receiver.

The enhanced message format may be characterized, for example as providing:

Type=0×21 Membership Query, 0×26 Membership Report, 0×27 Leave Group

The inclusion of the address field is to provide the IP addresses of host recipients joining or leaving an IP multicast session. The required actions on the part of a host receiver are to 1) issue a host membership report when joining a multicast group and 2) issue a leave group message when it leaves a multicast group. This information as described below allows the neighboring (i.e., edge router) router to track, in real time, the host receivers that are receiving IP multicast sessions.

Figure 3:
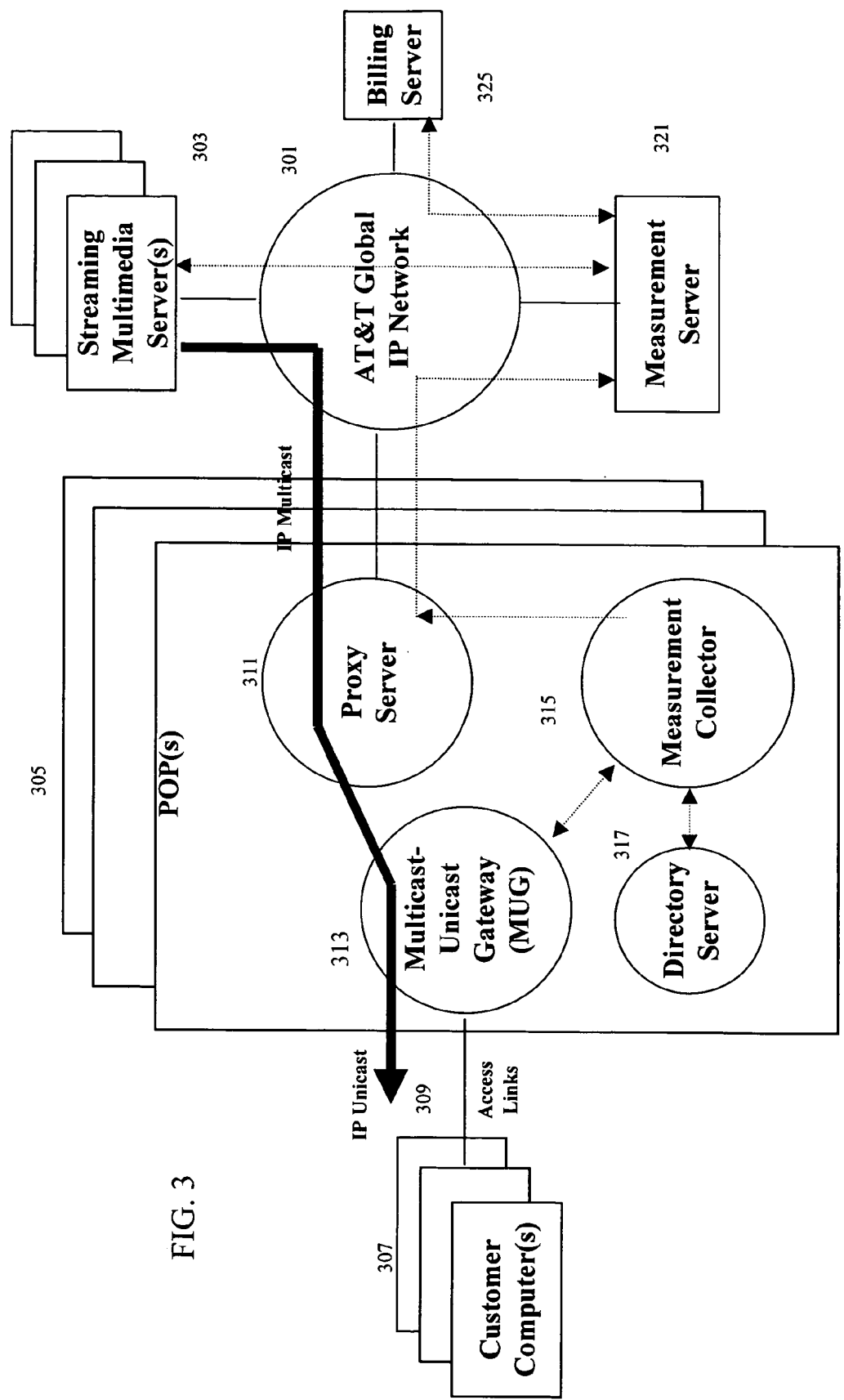
FIG. 3 is a schematic of a system supporting multicast sessions having unicast access links connecting a host receiver to the network Point-of-Presence.

A multicast system architecture using IP unicast Access Links coupling a host group to the POP of a multicast network is shown in the schematic of FIG. 3. A global IP network 301 is shown connecting streaming multimedia servers 303 to the Point-of-Presence (i.e., terminating point of the network where local device is coupled to the network) (POP) 305. The POP 305 is connected to a customer computer 307 over an unicast access link 309. Link 309 is this embodiment is an unicast link.

Streaming multimedia server 303 combines a plurality of media (i.e., audio, video, text, etc.) to produce an integrated signaling format. Streaming is accomplished by means of transmitting packets sufficiently fast so that significant buffering is not required by the recipient. Streaming is known to those in the art and need not be discussed in detail.

The streaming multimedia server 303 is connected to a global IP network 301. IP networks such as network 301 may use cable, fiber, wired or wireless transmission media. Selection or combining of media is well known and is not described in detail herein. The primary mode of information is structured into datagrams which are packets having source and group destination addresses and in the invention host recipient addresses.

The IP network 301 conforms to the IP protocol and transmits IP datagrams, in multicasting sessions to a host group represented by the plurality of customer computers 307, via the POP 305. POP 305 is a termination point for the network 301 and includes a proxy server 311 a multicast-unicast gateway 313, a measurement collector 315 and a directory server 317.

The proxy server 311 performs an address mapping function to act as a barrier (i.e., a firewall) between the IP network 301 and the MUG 313. MUG is a gateway (i.e., an edge device at the network terminus) which connects the multicast IP network 301 to the incompatible local unicast network of the customer computers 307. According to the invention the MUG includes enhanced software to permit determination of the number of customers (i.e., customer computers 307) currently receiving a multicast program. In the illustrative embodiment this requires counting of the IP unicast streams associated with the IP multicast stream. Gateway 313 also performs code and protocol conversions between the local unicast system and the network multicast system.

A measurement collector 315 is coupled to poll the MUG 313 and obtain the number-of-streams data from the MUG 313. It is also connected to collect profile information from a directory server 317 containing user profile information collected from many sources. This profile information is combined with the number of active host recipients to provide aggregate global information to enable evaluation of strategies by information source providers.

The information collected by the measurement collector 315 is forwarded via the proxy server 311 and IP network 301 to a measurement server 321 where it can be readily accessed by the network 301 and the providers of the streaming multimedia.

The measurement server is connected via the IP network 301 to a billing server 325, which maintains charging information related to providing the information service. The billing, to programming providers, may be on a subscription basis or on an individual per transaction use basis, for example.

Figure 4:
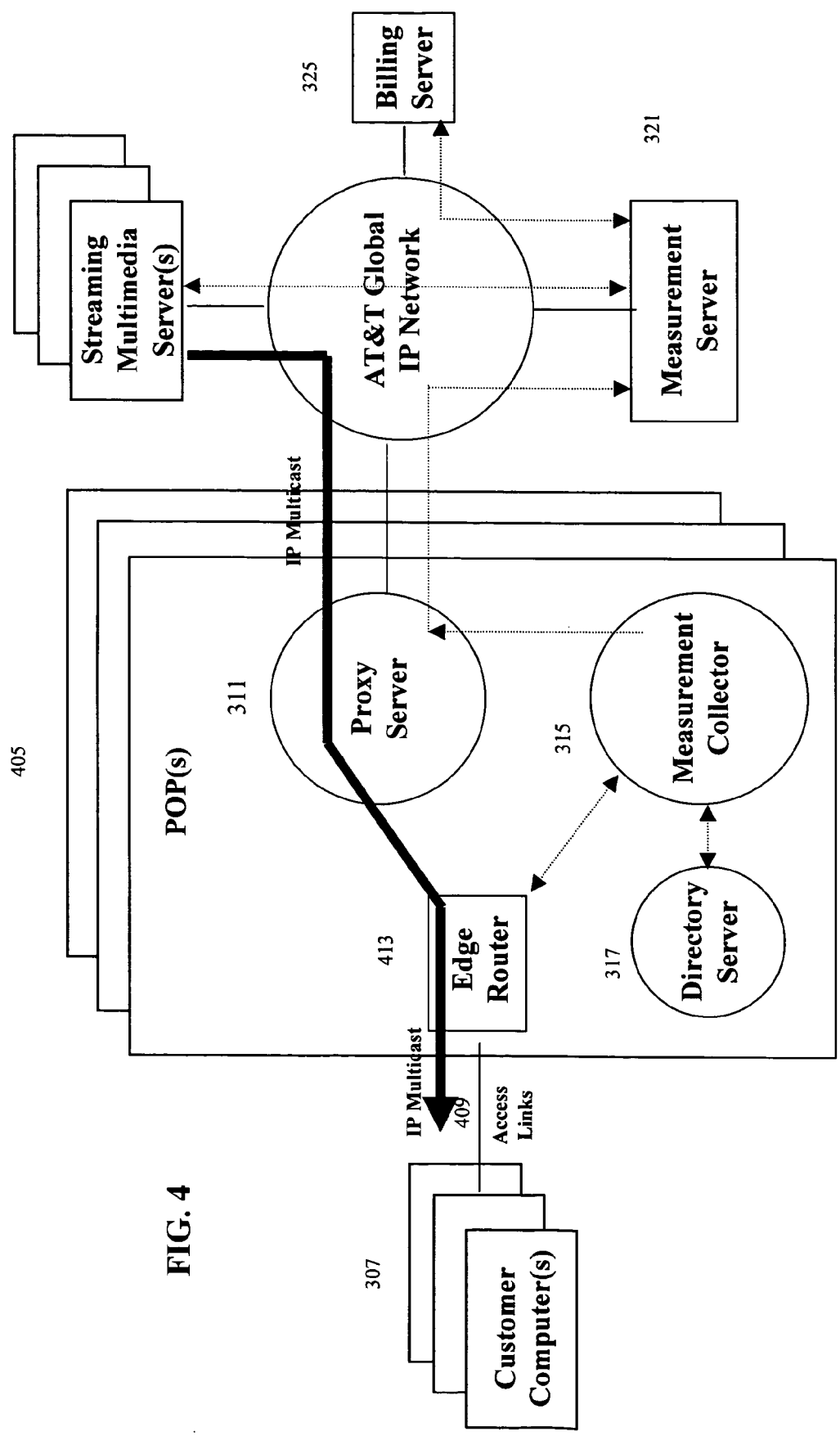
FIG. 4 is a schematic of a system supporting multicast sessions having multicast access links connecting a host receiver to the network Point-of-Presence.

System architecture using multicast access links 409 between a POP 405 and the host recipient customer computers 307 is schematically shown in the FIG. 4. POP 405 includes an edge router 413 (i.e., an edge device at the network terminus) to provide routing of the various multicast streams to the customer computers 307. The edge router 413 is enhanced with software to determine the number of customer computers receiving the IP multicast content. This is achieved by utilizing the header information, such as shown in FIG. 2 as the host addresses, included in the IGMP messages exchanged between the customer computers 307 and the edge router 413.

The measurement collector 315 periodically polls the edge router to record this data and by using information supplied by the directory server 317 to develop aggregate information about the recipients of the multicast session. The information is forwarded to the measurement server 312 and the billing server 325 provides billing.

An exemplary embodiment of the invention has been disclosed. It is to be understood that many variations of these embodiments may be created by those skilled in the art without departing from the spirit and scope of this invention.

What is claimed is:

1. A method of providing summary information about recipients of multicast sessions, comprising the steps of:
enhancing the operation of an edge device to count the number of recipient hosts of an IP multicast session;
storing the count in a measurement device and supplementing the count with information supplied from a directory source;

generating aggregate information about audience levels and demographics of recipient hosts of the multicast session; and supplying the information to a supplier of the multicast session permitting an immediate evaluation and response.

2. The method of claim 1 wherein:

the step of enhancing the operation of an edge device includes a step of counting streams traversing a MUG type edge device using an unicast link between the edge device and the recipient hosts.

3. The method of claim 1, wherein:

the step of enhancing the operation of an edge device includes a step of enhancing a protocol message to provide IP addresses of recipient hosts of the multicast session connected to the edge device.

4. The method of claim 1, further including:

a step of reporting IGMP membership and leave group reports from a host recipient to an edge device.

5. The method of claim 1, further including:

a step of aggregating information collected to insure privacy of individual host recipients.

6. The method of claim 1, wherein:

the step of supplying information includes a step of billing the supplier for the information provided.

7. The method of claim 1, wherein:

the step of supplementing the count includes a step of creating a directory-listing members of groups of multicast host recipients.

8. The method of claim 1, further including a step of:

enhancing IGMP messages to include IP addresses of hosts that join and leave multicast sessions.

9. The method of claim 1, further including a step of:

including IGMP software in an edge router and in a host PC to report IP addresses of host recipients as they join and leave multicast sessions.

10. The method of claim 1, further including a step of: including with an edge router an enhancement to provide IP addresses of host computers that join and leave multicast sessions.

* * * * *